United States Patent [19]

VanDam

[11] Patent Number: 5,780,719

[45] Date of Patent: Jul. 14, 1998

[54] WINDSHIELD WIPER RAIN SENSOR SYSTEM

[76] Inventor: Scott A. VanDam, 18 Olive St., Newington, Conn. 06111-2576

[21] Appl. No.: 786,266

[22] Filed: Jan. 22, 1997

[51] Int. Cl.[6] .................. B60S 1/08; H02P 3/00; G01R 27/26

[52] U.S. Cl. .................. 73/29.01; 318/483; 340/604; 73/73

[58] Field of Search .................. 73/29.01, 73; 318/444, 318/483; 361/286

[56] References Cited

U.S. PATENT DOCUMENTS

| | | | |
|---|---|---|---|
| Re. 33,848 | 3/1992 | Shiraishi | 318/444 |
| 3,649,898 | 3/1972 | Inoue | 318/483 |
| 3,864,659 | 2/1975 | Furuuchi et al. | 338/35 |
| 3,995,140 | 11/1976 | Kuiff et al. | 219/203 |
| 4,127,763 | 11/1978 | Roselli | 219/203 |
| 4,132,881 | 1/1979 | Ciarniello et al. | 219/203 |
| 4,317,073 | 2/1982 | Blaszkowski | 318/483 |
| 4,527,105 | 7/1985 | Shiraishi | 318/444 |
| 4,527,106 | 7/1985 | Fischer | 318/483 |
| 4,554,493 | 11/1985 | Armstrong | 318/444 |
| 4,620,141 | 10/1986 | McCumber et al. | 318/483 |
| 4,639,831 | 1/1987 | Iyoda | 361/286 |
| 4,665,351 | 5/1987 | Nyberg | 318/483 |
| 4,705,998 | 11/1987 | Millerd et al. | 318/444 |
| 4,764,773 | 8/1988 | Larsen et al. | 343/713 |
| 4,805,070 | 2/1989 | Koontz et al. | 361/286 |
| 4,812,615 | 3/1989 | Manzoni | 219/209 |
| 4,827,198 | 5/1989 | Mueller et al. | 318/483 |
| 4,916,374 | 4/1990 | Schierbeek et al. | 318/483 |
| 4,942,349 | 7/1990 | Millerd et al. | 318/483 |
| 4,960,996 | 10/1990 | Hochstein | 250/349 |
| 4,973,844 | 11/1990 | O'Farrell et al. | 250/341 |
| 4,987,296 | 1/1991 | Kajioka et al. | 250/222.1 |
| 5,040,411 | 8/1991 | Medzius | 73/173 |
| 5,057,754 | 10/1991 | Bell | 318/483 |
| 5,059,877 | 10/1991 | Teder | 318/444 |
| 5,092,169 | 3/1992 | Bilanin et al. | 73/178 R |
| 5,276,389 | 1/1994 | Levers | 318/444 |
| 5,334,942 | 8/1994 | Hulse et al. | 324/694 |
| 5,414,257 | 5/1995 | Stanton | 250/227.25 |
| 5,659,294 | 8/1997 | Schröder | 340/602 |

Primary Examiner—Hezron E. Williams
Assistant Examiner—J. David Wiggins
Attorney, Agent, or Firm—McCormick, Paulding & Huber

[57] ABSTRACT

A rain sensor system automatically controls windshield wiper action such as the length of time between windshield wiper strokes and/or wiper motor speed and is preferably integrated with a vehicle antenna. The rain sensor system comprises first and second electrical conductors spaced uniformly from one another and an electrical insulator interposed therebetween. A dual network voltage divider circuit couples the first conductor to an applied reference DC voltage level, and the second conductor is coupled to ground potential via a similar network. Airborne raindrops and moisture temporarily adhere to the exposed surfaces of the insulator to electrically couple the exposed surfaces of the first and second conductive surfaces to lower the electrical resistance therebetween. The magnitude of the applied voltage changes in relation to the intensity of rainfall or amount of raindrops adhering to the conductors to affect the rate of windshield wiper action. An rpm speed linearizing circuit may also be employed to compensate the rate of windshield wiper action in response to vehicle speed. The conductor has an elongated shape for providing self-clearing of raindrops or moisture from the sensor.

22 Claims, 4 Drawing Sheets

WINDSHIELD WIPER RAIN SENSOR SYSTEM

FIELD OF THE INVENTION

The present invention relates generally to a vehicle rain sensor system, and more particularly relates to a vehicle rain sensor system that automatically controls windshield wiper speed or intermittency in response to rainfall intensity.

BACKGROUND INFORMATION

Conventional automatic windshield wiper rain sensors are known for activating the windshield wipers of a vehicle in response to sensed precipitation. A number of these rain sensors use planar sensors that are mounted to the windshield so that they can be periodically returned to a non-precipitation indicating state upon a sweep of the windshield wipers past the sensor. These precipitation sensors are typically of complex design requiring, for example, closely spaced interdigital transducers or comb-like sensor elements. One attempt to simplify a self-clearing precipitation sensor is disclosed in U.S. Pat. No. 4,527,106 that uses a planar sheet of electrically insulating material interposed between electrodes to form a conductive sensor. Unfortunately, a holder of complex construction is required to hold or cantilever the planar sensor on an external surface of the vehicle.

It is an object of the present invention to provide a self-clearing rain sensor that does not require wiper activation for sensor clearing, complex holders for sensor mounting, or additional mounting space on any external or internal surface of the vehicle.

It is a further object of the present invention to employ a rain sensor having a shape that is of greater self-clearing efficacy.

It is a still further object of the present invention to provide a rain sensor that can be incorporated with an antenna of the vehicle.

It is yet a further object of the present invention to provide a rain sensor and windshield wiper activation system employing a speed or revolutions-per-minute (rpm) feedback signal to adjust the rain sensor's sensitivity.

SUMMARY OF THE INVENTION

The present invention is directed to a rain sensor system for automatically controlling windshield wiper action in association with rain conditions. The rain sensor system comprises first and second electrical elongated conductors having exposed conductive surfaces, the conductors being arranged in spaced parallel relationship with one another. An electrical insulator is interposed between the conductors, and has an insulating surface exposed between the exposed conductive surfaces of the conductors. Means for mounting the elongated conductors and insulator in the airflow over a vehicle is provided to allow the conductive and insulating surfaces to be wetted by rain, whereby the resistance between the elongated conductors is reduced and used to detect the presence and absence of rain on the vehicle.

One advantage of the present invention is that the rain sensor system can be integrated with an antenna, and therefore does not require additional mounting space on either internal or external surfaces of the vehicle. As such, the integrated rain sensor system is inconspicuous.

Another advantage of the present invention is that the sensor system when integrated with an antenna does not require additional and complex mounting systems which are associated with planar sensor systems.

2

A further advantage of the present invention is that the upright elongated shape of the sensor aids in the self-clearing of raindrops from the rain sensor system, thereby contributing to an inexpensive means for providing a real time indication of the intensity of the rainfall impinging on the sensor system.

Other advantages of the present invention will become apparent in view of the following detailed description and accompanying drawings.

DETAILED DESCRIPTION OF THE PREFERRED EMBODIMENTS

Figure 1A:
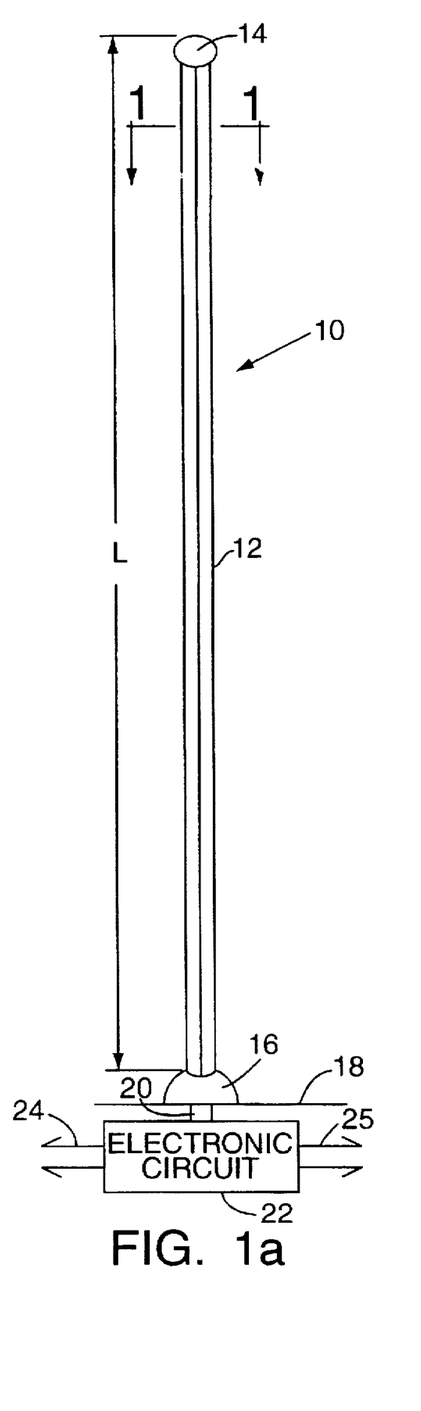
FIG. 1a is a schematic side elevational view of a rain sensor that is integral with a vehicle antenna.

FIG. 1 schematically illustrates a self-clearing rain sensor system 10 associated with a vehicle (not shown) for controlling windshield wiper action, preferably the rate of windshield wiper action (i.e., the length of time between windshield wiper strokes) in response to rainfall intensity. The system 10 preferably functions as both a rain sensor and an antenna. The antenna is fixed and not intended to be retracting. For purposes of illustration, the rain sensor system 10 will be explained and illustrated in the following drawings concerning this dual function. However, the rain sensor may be employed independently from the antenna.

The rain sensor of the rain sensor system 10 generally takes the form of a whip-type AM/FM vehicle receiving antenna and comprises a body 12, an electrically non-conducting sharps-reducing cap 14 and an electrically non-conductive base 16 mounted on a vehicle surface 18. The body 12 functions as the primary part of the rain sensor to generate a rain intensity signal, and also may function as part of an antenna, as shown in the figures, to receive RF signals. The body 12 has a length L typically associated with the wavelength of radio frequencies received and/or the receiver's required sensitivity. At the time of manufacture, components can be adjusted for any reasonable L. Although the body 12 of the rain sensor system 10 is preferably provided in an upright position, the body 12 may extend at any desired angle between vertical and horizontal orientations so long as the body 12 is mounted on a vehicle where there is an unobstructed oncoming airstream path to the sensor.

The body 12 of the rain sensor system 10 is electrically coupled via a first electrical connector 20 to an electronic circuit 22 (the function of which will be explained below) preferably located in an enclosure immediately under the base 16 or as close thereto as possible. The electronic circuit 22 is electrically coupled via a second connector 24 to a remote conventional wiper delay control module or microcontroller (not shown) for controlling windshield wiper action in response to sensed rainfall intensity. The wiper delay control module typically has a switch offering several settings such as: off, low speed wipe, high speed wipe, and delay-on or intermittent wipe. The present invention will be described for operation when the wiper delay control module is switched to delay-on. When the rain sensor system 10 also functions as an antenna, as shown in the figures, the rain sensor system 10 electrically couples received RF signals via a third electrical connector 25, preferably a coaxial or other shielded cable, to a conventional radio antenna input jack.

Figure 1B:
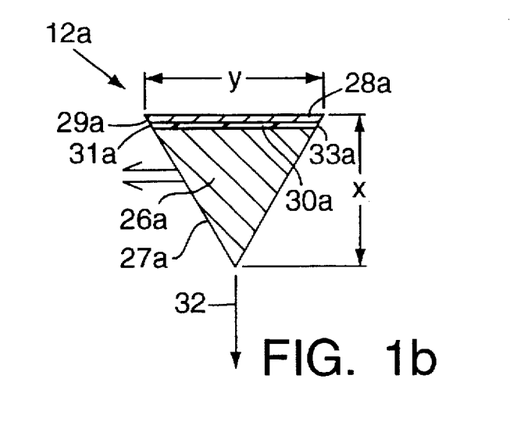
FIG. 1b is a schematic cross-sectional view of the rain sensor of FIG. 1a taken along the lines 1—1 showing a triangular cross-section.

As shown in FIG. 1b, the rain sensor itself has a body 12a which is preferably triangular in cross-section as seen along the section lines 1—1 of FIG. 1a. The triangular-shaped body 12a comprises a first electrical conductor 26a having a first exposed conductive surface 27a, and a second electrical conductor 28a having a second exposed conductive surface 29a. The conductors are electrically insulated from each other by an insulator 30a interposed therebetween. The insulator 30a has, generally oppositely facing first and second exposed insulating surfaces 31a, 33a. The insulator 30a is flanked on either side by an insulating adhesive in order to hold the two conductors together in a unified and manufacturable assembly. The conductors are preferably composed of a metallic conducting material such as stainless steel or aluminum.

As will be explained more fully in the following figures, a DC voltage $V_A$ is applied to the first conductor 26a to generate an electrical current via insulator-bridged raindrops which electrically couple the first and second conductors 26a, 28a to one another. The voltage level of $V_A$ across a sink network is proportional to the instantaneous rainfall intensity impinging on the body of the rain sensor system 10. When the body 12a is dry, the electrical resistance between the conductors 26a, 28a exceeds a predetermined maximum value to provide for wiper action being completely turned off. When the body 12a is wet, raindrop moisture temporarily adheres to the exposed insulating surfaces 31a, 33a so as to bridge the first and second conductive surfaces 27a, 29a, thereby electrically coupling the first and second conductors 26a, 28a.

Because rain water has a lower electrical resistance (approximately 18.3 MΩ-cm) relative to the insulator 30a (greater than 100 MΩ-cm), the rain moisture coupling the conductors is in effect an electrical resistance placed in parallel with the insulator 30a which thereby lowers the electrical resistance between the conductors 26a, 28a relative to a dry condition. As the intensity of rainfall increases, the number of raindrops or "parallel resistors" bridging the conductors 26a, 28a increases which results in decreasing the electrical resistance and increasing the current density between the conductors. The value of this decreasing electrical resistance relative to increasing rain intensity is used to increase the rate of windshield wiper action when the conventional wiper delay control module is switched to delay-on mode. The elongated shape of the conductors and insulator as exposed to an airstream have been found to enhance the "self-clearing" of rain moisture from the sensor body for various vehicle speeds. At idle, or when the vehicle is not in motion (and the self-clearing effect is minimal), the reduced vehicle speed provides a sensor desensitization for any raindrops or moisture accumulating on the sensor body 12. Rather than adjusting windshield wiper action relative to "accumulated" rain moisture, the present invention provides for adjusting wiper action relative to a "linearized instantaneous" rain moisture signal. Thus, the self-clearing rain sensor system provides a real time indication of the rain intensity impinging on the sensor system.

As shown in FIG. 1b, the first and second conductors 26a, 28a and the insulator 30a preferably cooperate to form an isosceles triangle in cross-section. The first conductor 26a takes up a substantial portion of the body 12a and is itself triangular in cross-section, whereas the insulator 30a and the second conductor 28a are preferably planar strips having minimal thickness relative to the first conductor 26a. The insulator 30a has a coefficient of thermal expansion similar to that of the metal conductors 26a, 28a. The body 12a is preferably oriented in the direction of vehicle motion as shown by the arrow 32 such that the exposed conductive surfaces 27a, 29a do not directly face in the direction of vehicle movement. The triangular shape and orientation of the body 12a provide an efficient means for parting the airstream in laminar flow and raindrops borne thereon closely around the exposed surfaces of the body 12a such that raindrops are momentarily deposited (depending on vehicle speed relative to oncoming airflow) onto the exposed insulator surfaces 27a, 29a to electrically couple the conductors.

Figure 1C:
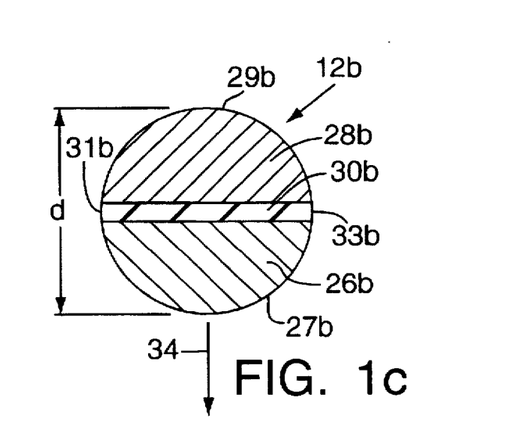
FIG. 1c is an alternative schematic cross-sectional view of the rain sensor of FIG. 1a taken along the lines 1—1 showing a circular cross-section.

As shown in FIG. 1c, the rain sensor system 10 alternatively may have a body 12b which is non-triangular in cross-section as seen in the direction of lines 1—1 of FIG. 1a. A first conductor 26b having a first exposed conductive surface 27b, and a second conductor 28b having a second exposed conductive surface 29b are each generally semi-circular and of the same cross-sectional area with respect to each other. The conductors 26b, 28b are interposed by an insulator 30b, having exposed insulating surfaces 31b and 33b. The insulator 30b is preferably a planar strip having a similar coefficient of thermal expansion as the metal conductors. The body 12b is preferably oriented in the direction of vehicle motion as shown by the arrow 34 such that the portion of the exposed insulating surfaces 31b, 33b midway between the first and second conductive surfaces generally faces perpendicularly to the direction of vehicle motion for the purpose of achieving optimal self-clearing effect. Although the circular cross-section configuration of the body 12b is sufficient for determining the intensity of rainfall, the circular shape has been found to create mild air turbulence of the airstream impinging on the body 12b such that raindrops are not deposited on the insulator 30b as efficiently relative to the triangular body 12a of FIG. 1b. However, a more aesthetic design and greater efforts to linearize any such produced rain signal may eventually be realizable.

Figure 2:
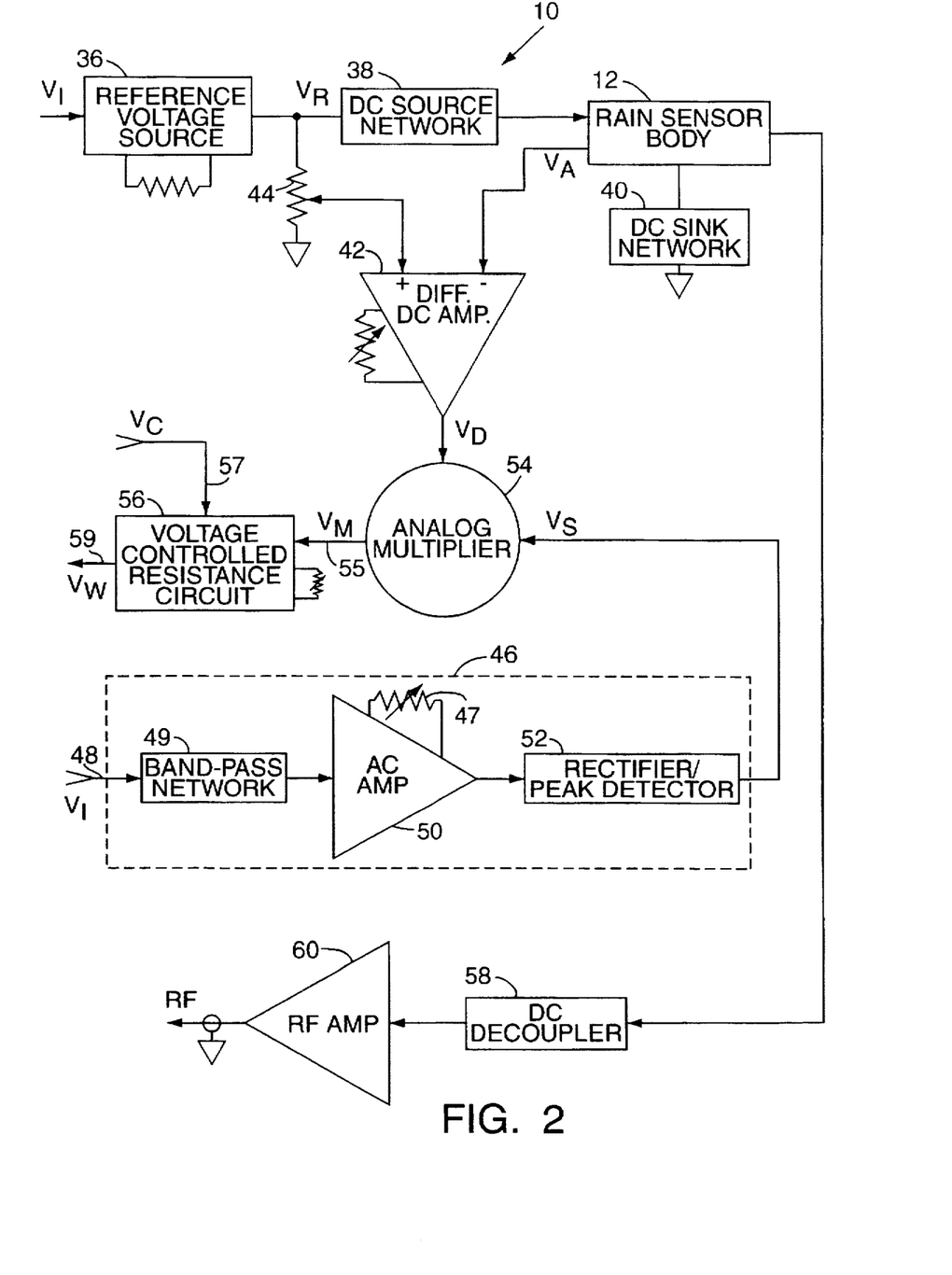
FIG. 2 is a block diagram of an integral rain-sensing antenna system incorporated with a conventional wiper delay control module.

FIG. 2 illustrates in block diagram the components of the rain sensor system 10. A reference voltage source 36 provides a fixed, DC reference voltage $V_R$, via a voltage divider to a DC source network 38, which in turn provides a DC voltage to one of the conductors of the rain sensor body 12. The voltage $V_A$ of the conductor increases or decreases as a function of a respective decrease or increase in rainfall intensity. A DC sink network 40 provides a DC electrical path to ground potential in order to complete a DC electrical loop for the applied DC reference voltage.

A differential DC amplifier 42 has a positive input terminal which receives the reference voltage $V_R$ via a precision voltage dividing network (shown as a potentiometer 44) from the reference voltage source 36, and a negative input terminal which receives the applied voltage from the rain sensor body 12 in order to generate a rain factor signal having a DC voltage level indicative of the rain intensity impinging on the rain sensor body 12. The potentiometer 44 interposed between the reference voltage source 36 and the positive input terminal of the differential DC amplifier 42 is used to calibrate the rain sensor system 10 for a specific vehicle type implementation. Once calibration is complete, the potentiometer 44 is preferably replaced by precision resistors.

An rpm/speed detector 46 provides a DC voltage indicative of the speed of the vehicle in order to increase or decrease the sensitivity of the sensor in response to a respective increase or decrease in vehicle speed. Thus, the speed of the vehicle provides a linearizing factor to the rainfall intensity signal for controlling the rate of windshield wiper action. The vehicle's +12 volt DC supply deriving from its battery includes an AC ripple as a residual component of the alternating voltage generated from the vehicle's alternator/rectifier. The speed detector 46 simply demodulates and rectifies this ripple associated with the vehicle's alternator/rectifier. The peak-to-peak amplitude of the ripple component is known to correspond to the speed of the vehicle in high gear, and therefore can be used to measure the vehicle's speed for the purpose of linearizing the windshield wiper action for various speeds and rain intensities. Typically, the peak-to-peak amplitude ranges from about 15 millivolts at engine idle to about 150 millivolts at the vehicle's full speed, but can be compensated via a resistor 47 for vehicles having different alternator/rectifier system parameters.

The DC ripple signal is demodulated via a band-pass network 49 which passes only frequencies between the range of approximately 1 KHz to approximately 20 KHz that are associated with the AC ripple from the alternator/rectifier. The ripple signal is then boosted via AC amplifier 50, before being processed by a rectifier/peak detector 52 which generates a DC speed factor signal having a voltage level indicative of the speed of the vehicle.

The rain factor signal from the differential DC amplifier 42 and the speed factor signal from the speed detector 46 are input to an analog multiplier 54 which multiplies the voltage level of the two signals in order to generate at its output 55 a DC rainfall intensity signal voltage that is speed-sensitivity-linearized. A voltage-controlled resistance circuit 56 has an input coupled to the output of the analog multiplier 54, and is actuated via a delay-on variable-resistance command signal at 57 from a conventional wiper delay control switch (not shown). When the resistance circuit 56 is enabled, the resistance of the resistance circuit 56 changes in proportion to the magnitude of the DC rainfall intensity signal provided at the multiplier output 55. The varying resistance of the resistance circuit 56 in turn simulates the effect of the variable resistance of a conventional delay control switch to the delay control module, thus providing an automatic continuous adjustment of wiper delay as long as a minimum predetermined moisture threshold is detected on the sensor. The voltage controlled output signal 59 from the voltage controlled resistance circuit 56 is coupled to the wiper delay module for controlling the rate of windshield wiper action (i.e., the length of time between windshield wiper strokes) as a function of the voltage magnitude of the voltage controlled output signal.

In the rare event that the range of frequencies intended for radio reception are below approximately 500 KHz, the rain sensor system 10 may include a DC decoupler 58 and/or an RF amplifier 60 for boosting the RF signal produced by the body 12 of the rain sensor to an input jack of a radio receiver (not shown).

Figure 3:
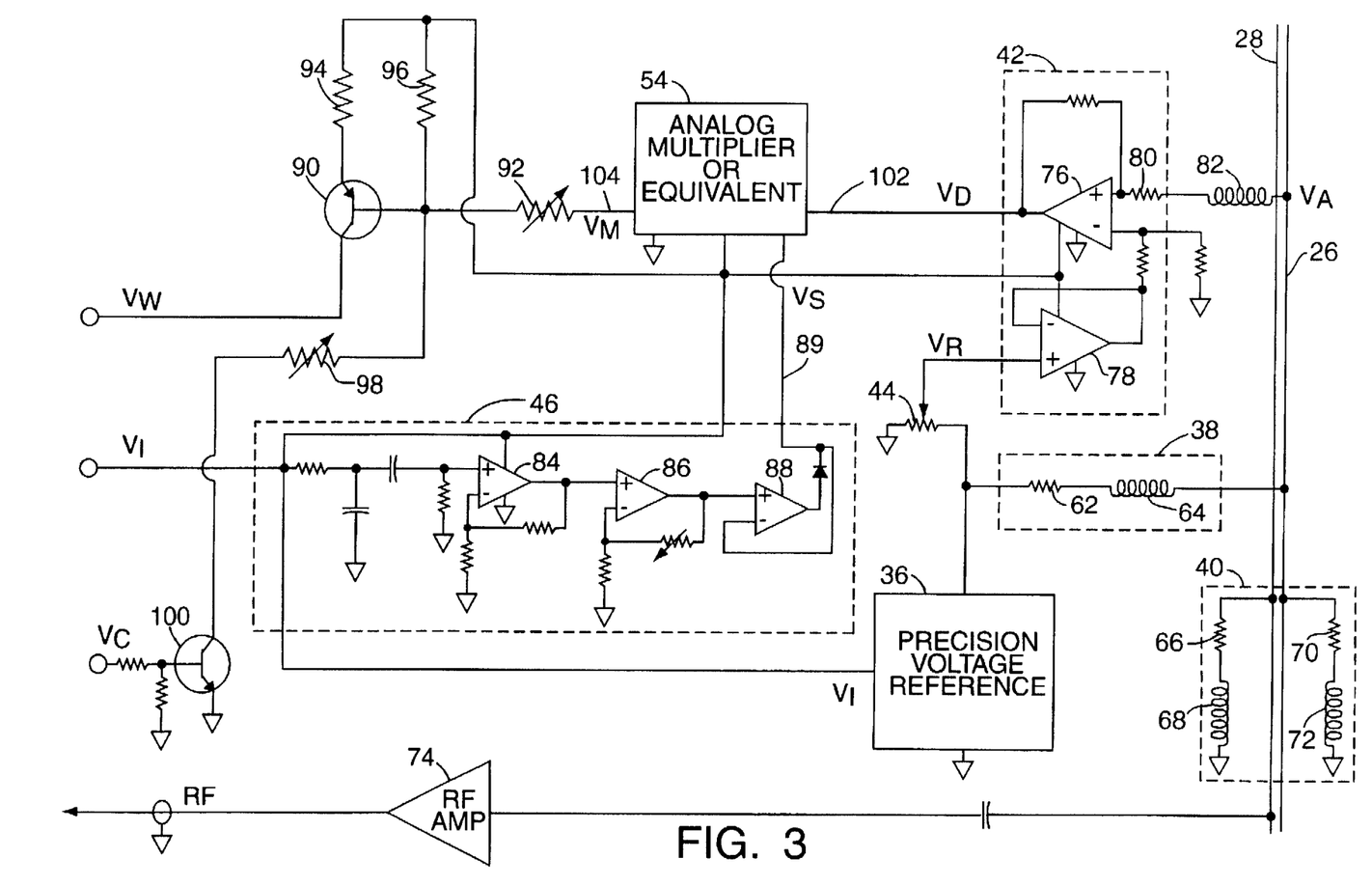
FIG. 3 schematically shows a preferred embodiment of the integral rain-sensing antenna system of FIG. 2.

Turning now to FIG. 3, a preferred embodiment of the rain sensor system 10 of FIG. 2 is schematically illustrated.

The reference voltage source 36 is preferably an MPREF10/ PMI REF10 +10 Volt Precision Voltage Reference which is supplied with +12 volts of an ignition switched, vehicle charging signal from the conventional wiper delay control switch (not shown). The reference voltage source 36 is coupled to the first conductor 26 of the body 12 of the rain sensor system 10 via the DC source network 38. As can be seen in FIG. 3, the DC source network preferably comprises a resistor 62 and an inductor 64 connected in series between the reference voltage source 36 and the first conductor 26. The DC sink network 40 comprises a resistor 66 and inductor 68 connected in series between the conductor 28 and ground potential, and further includes a resistor 70 and an inductor 72 connected in series between the conductor 26 and ground potential. The resistor 62 of the DC source network 38 and the resistor 70 of the DC sink network 40 cooperate to provide a voltage divider circuit to supply a reference applied voltage $V_A$ at the first conductor 26. The inductors of the DC source and sinks network 38 and 40 decouple the conductors at RF frequencies to minimize RF losses to the RF signal received by the rain sensor body 12. An RF pre-amplifier 74, having an input coupled to the second conductor 28 of the sensor body 12 and an output coupled to the radio input jack, optionally compensates for small coupling losses in the AM band.

The differential DC amplifier 42 preferably comprises first and second operational amplifiers 76, 78. The negative input of the differential amplifier 42 corresponds to the positive input of the op-amp 78 which receives an adjustable reference voltage from the reference voltage source 36 via the offset potentiometer 44. The positive input of the differential amplifier 42 corresponds to the positive input of the op-amp 76 which receives the applied voltage $V_A$ from the first conductor 26 via an RF isolation network comprised of a resistor 80 and an inductor 82 connected in series between the first conductor 26 and the positive input of the op-amp 76.

The speed detector 46 preferably comprises 741 op-amps 84, 86 and 88 connected, as shown in FIG. 3, to provide band-passing amplification, and rectification of the peak-to-peak amplitude of the vehicle's alternator/rectifier AC ripple component. As the peak-to-peak amplitude of the ripple component input into the speed detector 46 increases, the speed detector 46 generates a DC speed factor signal having a magnitude which is approximately proportional to the speed of the vehicle. The output 89 from the op-amp 88 of the speed detector 46 supplies the speed factor signal and is coupled to a first input of the analog multiplier 54. The output of the op-amp 76 of the differential amplifier 42 supplies the second input of the analog multiplier 54 with a differential signal having a voltage level equal to the difference between the applied voltage $V_A$ and the voltage reference $V_R$.

The voltage-controlled resistance circuit 56 of FIG. 2 preferably comprises a PNP transistor 90, such as an MPS 9468 transistor, having a base coupled to the output of the analog multiplier 54 via a potentiometer 92, a resistor 94 having a first end coupled to the emitter of the transistor 90 and a second end coupled to the ignition switched 12 volts, a pull up/off resistor 96 having a first end coupled to the base of the transistor 90 and a second end coupled to the ignition switched 12 volts, and a potentiometer 98 having a first end coupled to the base of the transistor 90 and a second end coupled to enable transistor switch 100 for activating the automatic wipe feature. The enable switch 100 is preferably an NPN transistor, such as an MPS 2222 transistor. The collector of the transistor switch 100 is coupled to the second end of the resistor 98, the base is coupled to a delay-on switch setting of the wiper control switch (not shown), and the emitter is connected to ground potential.

The operation of the rain sensor system of FIG. 3 will now be explained in greater detail. The vehicle's +12 volt DC supply signal $V_I$ from the vehicle ignition switch is supplied via the wiper control switch to the reference voltage source 36 for generating a DC time and temperature stable reference output voltage $V_R$. The potentiometer 44 is used for calibration, and is preferably replaced by precision resistors for a particular vehicle and sensor length L. The reference voltage is applied to the voltage divider comprised of the DC source and sink networks 38, 40 such that the applied voltage $V_A$ at the first sensor conductor 26 is at a precisely defined value, such as, for example, +5 volts when the sensor is dry). When the sensor body 12 is dry, current flows from the reference voltage source 36 through the resistor 62 and the inductor 64 of the DC source network 38, to the first conductor 26, and through the resistor 70 and the inductor 72 to ground potential. Preferably, the resistor 62 of the source network 38 is equal in value to the resistor 70 of the sink network 40 so that the first conductor 26 is interposed in the voltage divider network at a voltage level approximately midway between that of the reference voltage source 36 and ground potential.

When the sensor body 12 becomes wet because of rainfall, rain moisture electrically couples the first and second conductors 26 and 28 to form a lower resistance between the conductors relative to a dry state. Consequently, an additional electrical path is established between the first conductor 26 and ground. This additional current path is from the first conductor 26 to the second conductor 28 via the rain moisture coupling the first and second conductors 26, 28, through the resistor 66 and the inductor 68 of the DC sink network 40 to ground. Thus, the series combination of the reduced resistance between the first and second conductors 26, 28 and the resistor 66 are in effect a resistor placed in parallel with the resistor 72. Consequently, the voltage level of $V_A$ associated with a dry state (+5 volts, for example) begins to decrease as the resistance between the conductors decreases with increased rainfall intensity.

The applied voltage $V_A$ is then compared with the reference voltage $V_R$ at the differential amplifier 42 to generate a rain factor signal voltage $V_D = V_A - V_R$ at an output 102 of the differential amplifier 42. As an example, when the sensor body 12 is dry, $V_A = V_R = +5$ volts DC. As the rainfall intensity increases the value of the applied voltage $V_A$ decreases such that the rain factor signal voltage $V_D$ decreases toward ground potential. $V_D$ is then multiplied by the speed factor signal voltage $V_S$ at the analog multiplier 54 to generate a product signal voltage $V_M$ at an output 104 of the analog multiplier 54, thereby constituting a speed linearized rainfall intensity signal.

Thus, $V_D$ preferably varies from about +5 volts DC during no rainfall to about +3.3 volts DC during maximum rain intensity, and the speed factor signal preferably varies from 0 volts DC at vehicle standstill to about +0.5 volts DC at maximum speed. When the NPN transistor 100 has enabled the PNP transistor 90 into conduction, and no rainfall is impinging the body 12 of the rain sensor system 10 which is moving with the vehicle at about an average speed (i.e., 40 mph), the base of the PNP transistor 90 is about +5 volts DC which in effect biases the transistor in an off or non-conducting state. When there is maximum rainfall, the base of the PNP transistor 90 is biased at about +0.6 volt DC to in effect place the transistor 90 into full conduction. Between minimum and maximum rainfall and at normal ranges of vehicle speed, the transistor 90 generally operates in its linear conducting region, thereby acting as a variable resistor to the conventional wiper delay control module via its collector. In effect, the delay control module receives a rainfall-modulated resistance setting in place of a driver selected potentiometer setting.

Figure 4:
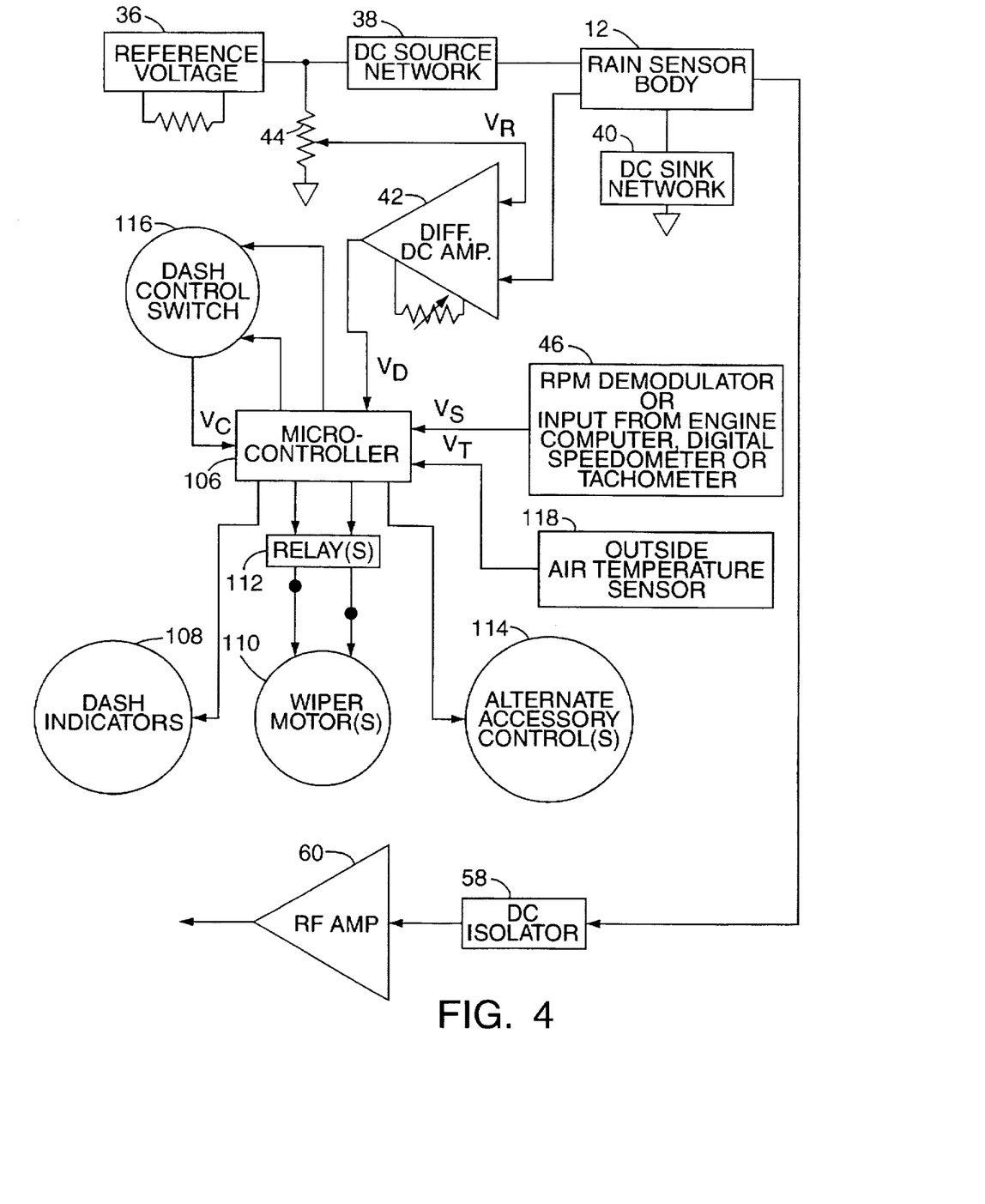
FIG. 4 is a block diagram of an integral rain-sensing antenna wiper control system that does not require a conventional wiper delay control module.

FIG. 4 is a block diagram of an integral rain-sensing antenna wiper control system that does not utilize a separate conventional wiper delay control module. Like elements with those shown in previous figures are labeled with like reference numbers.

The general interrelationship among elements of FIGS. 2 and 3 are the same as shown in FIG. 4 except that the differential DC amplifier 42 and the speed detector 46 are coupled to a microprocessor controller 106 which performs the remainder of the signal processing in order to control the rate of windshield wiper action (i.e., the speed of windshield wiper strokes and/or the length of time between windshield wiper strokes). The speed factor signal as received by the microcontroller is preferably analog but may be a digital signal if received directly from, for example, the engine computer or the vehicle speed control. The microcontroller 106 also receives inputs from the wiper control switch to activate wiper control functions. The microcontroller has its output coupled to wiper motor(s) 110 via relay 112, and is optionally connected to dash indicators 108 and/or accessory controls 114.

A dash control switch 116 informs the microcontroller that the wiper control system is in one of several user-selectable states. Preferably, the dash control switch may be in: off, low, high or an auto-delay mode that invokes the automatic wipe feature. The microcontroller monitors the change in this switch setting for automatic calibration purposes.

The microcontroller optionally also receives an outside air temperature input from an outside air temperature sensor 118 to enable an ice-accumulation linearization factor during winter driving conditions.

As will be recognized by those of ordinary skill in the pertinent art, numerous modifications may be made to the above-described and other embodiments of the present invention without departing from the scope of the present invention as set forth in the appended claims. Accordingly, the preceding portion of this specification is to be taken in an illustrative, as opposed to a limiting sense.

What is claimed is:

1. A rain sensor system for automatically controlling windshield wiper action, the rain sensor system comprising:

first and second electrical conductors uniformly spaced in parallel relationship with one another and having first and second exposed conductive surfaces respectively, and each conductor having an elongated shape;

a voltage divider circuit coupled to a DC supply voltage for imposing on the first conductor an applied voltage having a magnitude between that of the DC supply voltage and ground potential, the second conductor being coupled to ground potential; and an electrical insulator interposed between and coextensive with the first and second parallel, elongated conductors such that the first and second conductors and the insulator together form a thin elongated body resembling in shape a whip-type antenna for a vehicle, the insulator having an exposed insulating surface located between the first and second exposed conductive surfaces of the respective first and second conductors;

means for mounting the conductors and insulator to project outwardly from a vehicle exterior surface in an unobstructed location into oncoming airflow such that the airflow parts and flows around the conductors and insulator and airborne raindrops temporarily adhere to the exposed insulating surface to electrically couple the first and second conductive surfaces and lower the electrical resistance between the conductors, whereby the magnitude of the applied voltage changes in relation to the intensity of rainfall or raindrops adhering to the first and second conductors; and wiper control means coupled to the first conductor for generating a wiper control signal in accordance with the magnitude of the applied voltage and intensity of the rainfall.

2. A rain sensor system as defined in claim 1, further including an RF pre-amplifier coupled at one end to one of the electrical conductors and to be coupled at another end to a radio antenna input jack, the RF pre-amplifier boosting lower RF frequencies attenuated by the sensor circuitry.

3. A rain sensor system as defined in claim 1, wherein the insulator is an electrically inert adhesive.

4. A rain sensor system as defined in claim 1, wherein the insulator has a thermal expansion coefficient similar to that of the first and second electrical conductors.

5. A rain sensor system as defined in claim 1 in combination with a vehicle, wherein the conductors and insulator are received in the mounting means such that the conductors and insulator are in a generally upstanding position.

6. A rain sensor system as defined in claim 1 in combination with a vehicle, wherein the exposed insulating surface includes generally oppositely facing first and second exposed insulating surfaces to be oriented on the vehicle generally perpendicularly to the direction of vehicle movement.

7. A rain sensor system as defined in claim 1, wherein the voltage divider circuit comprises a resistor and inductor series combination to be positioned between the first conductor and a DC reference voltage source, and a similar valued resistor and inductor series combination positioned between the first conductor and ground potential.

8. A rain sensor system as defined in claim 1, further including:

a DC voltage reference circuit having an input to be coupled to a DC supply source for generating a generally fixed reference voltage at an output; and a differential amplifier having one input coupled to the first conductor and a second input coupled to the output of the voltage reference circuit for generating a rain factor signal having a DC voltage level indicative of the rain intensity or amount of raindrops electrically coupling the first and second conductors.

9. A rain sensor system as defined in claim 8, wherein the voltage reference circuit is time and temperature compensated against voltage drift.

10. A rain sensor system as defined in claim 1, wherein the conductors and the insulator cooperate to form an elongated self-supporting body of generally triangular cross section.

11. A rain sensor system as defined in claim 1, wherein the conductors and the insulator cooperate to form an elongated self-supporting body of generally circular cross section.

12. A rain sensor system for automatically controlling windshield wiper action, the rain sensor system comprising:

first and second electrical conductors uniformly spaced from one another and having first and second exposed conductive surfaces respectively, and each conductor having an elongated shape;

a voltage divider circuit coupled to a DC supply voltage for imposing on the first conductor an applied voltage having a magnitude between that of the DC supply voltage and ground potential, the second conductor being coupled to ground potential;

an electrical insulator interposed between and coextensive with the first and second conductors whereby the insulator has an exposed insulating surface located between the first and second exposed conductive surfaces of the respective first and second conductors;

a DC voltage reference circuit having an input coupled to a DC supply source for generating a generally fixed reference voltage at an output;

a differential amplifier having one input coupled to the first conductor and a second input coupled to the output of the voltage reference circuit for generating a rain factor signal having a DC voltage level indicative of the rain intensity or raindrops electrically coupling the first and second conductors;

a speed detector for generating a DC voltage level corresponding to the speed of a vehicle;

a voltage multiplier circuit, the multiplier circuit having a first input coupled to an output of the differential amplifier, and a second input coupled to an output of the speed detector, an output of the voltage multiplier circuit producing a rain intensity signal having a DC voltage level corresponding to a speed-sensitized instantaneous rainfall product; and means for mounting the conductors and insulator to project outwardly from a vehicle exterior surface in an unobstructed location into oncoming airflow such that airborne raindrops temporarily adhere to the exposed insulating surface to electrically couple the first and second conductive surfaces and lower the electrical resistance therebetween, whereby the magnitude of the applied voltage changes in relation to the intensity of rainfall or raindrops adhering to the first and second conductors.

13. A rain sensor system as defined in claim 12, further including a microcontroller for controlling the rate of windshield wiper action and/or wiper control speed, the output of the differential amplifier and the output of the speed detector being coupled to inputs of the microcontroller.

14. A rain sensor system as defined in claim 13, further including an outside air temperature sensor coupled to an input of the microcontroller to provide a linearizing profile associated with freezing rain/ice.

15. A rain sensor system as defined in claim 13, wherein the microcontroller includes a monitoring function for monitoring inputs of the microcontroller to accomplish self-linearization and periodic recalibration.

16. A rain sensor system as defined in claim 12, further including a voltage controlled resistance circuit coupled to the output of the voltage multiplier circuit, the resistance circuit including:

a control input to be coupled to a delay activation position of the switch of a conventional wiper delay control module for activating the automatic wiping feature;

a first terminal coupled to the output of the voltage multiplier; and a second terminal to be coupled to a delay adjust input of a conventional wiper delay control module, the resistance of the resistance circuit changing in response to the voltage level of the rain intensity signal received from the output of the multiplier circuit, the control voltage being indicative of the rate of windshield wiper action.

17. A rain sensor system as defined in claim 16, wherein the voltage controlled resistance circuit is a PNP transistor, the base being coupled to the output of the voltage multiplier circuit, the emitter to be coupled to a 12 volt supply voltage, and the collector to be coupled to the wiper delay adjust input of the wiper delay control module, the PNP transistor being biased in its linear conduction region during automatic wiping feature engagement.

18. A rain sensor system as defined in claim 17 further including an electronic switch interposed between the base of the PNP transistor and ground potential, the switch being activated by a windshield wiper delay control voltage signal, the PNP transistor being biased to the edge of its conduction (linear) region when the electronic switch is activated.

19. A rain sensor system for detecting rain on a vehicle, comprising:
  first and second electrical elongated conductors having exposed conductive surfaces, the conductors being arranged in spaced parallel relationship with one another;
  an electrical insulator interposed between the conductors, the insulator having an insulating surface exposed between the exposed conductive surfaces of the conductors,
  the first and second conductors and the insulator together forming a thin elongated body resembling in shape a whip-type antenna for a vehicle; and
  means for mounting the elongated conductors and insulator in the airflow over a vehicle in an unobstructed location such that the airflow parts and flows around the conductors and insulator and the conductive and insulating surfaces are wetted by rain, whereby the resistance between the elongated conductors is reduced and used to detect the presence and absence of rain on the vehicle.

20. A rain sensor system for automatically controlling windshield wiper action, the rain sensor system comprising:
  first and second electrical conductors uniformly spaced from one another and having first and second exposed conductive surfaces respectively, and each conductor having an elongated shape;
  a voltage divider circuit coupled to a DC supply voltage for imposing on the first conductor an applied voltage having a magnitude between that of the DC supply voltage and ground potential, the second conductor being coupled to ground potential;
  an electrical insulator interposed between and coextensive with the first and second conductors whereby the insulator has an exposed insulating surface located between the first and second exposed conductive surfaces of the respective first and second conductors, the electrical conductors and insulator cooperating to take the general shape of a vehicle antenna;
  an RF pre-amplifier coupled at one end to one of the electrical conductors and to be coupled at another end to a radio antenna input jack, the RF pre-amplifier boosting lower RF frequencies attenuated by the sensor circuitry; and
  means for mounting the conductors and insulator to project outwardly from a vehicle exterior surface in an unobstructed location into oncoming airflow such that airborne raindrops temporarily adhere to the exposed insulating surface to electrically couple the first and second conductive surfaces and lower the electrical resistance therebetween, whereby the magnitude of the applied voltage changes in relation to the intensity of rainfall or raindrops adhering to the first and second conductors.

21. A rain sensor system for automatically controlling windshield wiper action, the rain sensor system comprising:
  first and second electrical conductors uniformly spaced from one another and having first and second exposed conductive surfaces respectively, and each conductor having an elongated shape;
  a voltage divider circuit coupled to a DC supply voltage for imposing on the first conductor an applied voltage having a magnitude between that of the DC supply voltage and ground potential, the second conductor being coupled to ground potential;
  an electrical insulator interposed between and coextensive with the first and second conductors whereby the insulator has an exposed insulating surface located between the first and second exposed conductive surfaces of the respective first and second conductors, the insulator being an electrically inert adhesive; and
  means for mounting the conductors and insulator to project outwardly from a vehicle exterior surface in an unobstructed location into oncoming airflow such that airborne raindrops temporarily adhere to the exposed insulating surface to electrically couple the first and second conductive surfaces and lower the electrical resistance therebetween, whereby the magnitude of the applied voltage changes in relation to the intensity of rainfall or raindrops adhering to the first and second conductors.

22. A rain sensor system for automatically controlling windshield wiper action, the rain sensor system comprising:
  first and second electrical conductors uniformly spaced from one another and having first and second exposed conductive surfaces respectively, and each conductor having an elongated shape;
  a voltage divider circuit coupled to a DC supply voltage for imposing on the first conductor an applied voltage having a magnitude between that of the DC supply voltage and ground potential, the second conductor being coupled to ground potential;
  an electrical insulator interposed between and coextensive with the first and second conductors whereby the insulator has an exposed insulating surface located between the first and second exposed conductive surfaces of the respective first and second conductors, the insulator having a thermal expansion coefficient similar to that of the first and second electrical conductors; and
  means for mounting the conductors and insulator to project outwardly from a vehicle exterior surface in an unobstructed location into oncoming airflow such that airborne raindrops temporarily adhere to the exposed insulating surface to electrically couple the first and second conductive surfaces and lower the electrical resistance therebetween, whereby the magnitude of the applied voltage changes in relation to the intensity of rainfall or raindrops adhering to the first and second conductors.

* * * * *